(12) United States Patent
Herrenschmidt et al.

(10) Patent No.: US 8,364,933 B2
(45) Date of Patent: Jan. 29, 2013

(54) SOFTWARE ASSISTED TRANSLATION LOOKASIDE BUFFER SEARCH MECHANISM

(75) Inventors: Benjamin Herrenschmidt, Narrabundah (AU); Jason Michael Hopp, Apex, NC (US); Kenichi Tsuchiya, Cary, NC (US); Maciej Piotr Tyrlik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 12/641,766

(22) Filed: Dec. 18, 2009

(65) Prior Publication Data

US 2011/0153955 A1   Jun. 23, 2011

(51) Int. Cl.
*G06F 12/10* (2006.01)

(52) U.S. Cl. ......................... 711/207; 711/216

(58) Field of Classification Search ........................ None
See application file for complete search history.

(56) References Cited

U.S. PATENT DOCUMENTS

| | | | |
|---|---|---|---|
| 5,918,251 A | 6/1999 | Yamada et al. | |
| 6,418,523 B2 | 7/2002 | Porterfield | |
| 6,681,297 B2 | 1/2004 | Chauvel et al. | |
| 6,728,800 B1 | 4/2004 | Lee et al. | |
| 7,089,398 B2 * | 8/2006 | Zhang | 711/207 |
| 7,543,132 B1 | 6/2009 | Grohoski et al. | |
| 7,590,820 B2 * | 9/2009 | Dong et al. | 711/209 |
| 7,739,477 B2 * | 6/2010 | Bradford et al. | 711/206 |
| 2007/0162683 A1 | 7/2007 | Hattori et al. | |
| 2007/0283125 A1 | 12/2007 | Manczak et al. | |
| 2008/0235487 A1 | 9/2008 | Illikkal et al. | |
| 2008/0301362 A1 | 12/2008 | Cavanna et al. | |

OTHER PUBLICATIONS

"Address Translation using Variable-Sized Page Tables", IBM Technical Disclosure, IP.com No. IPCOM000018736D, Aug. 4, 2003, pp. 1-6.
Ngai et al., "Translation Lookaside Buffer with Floating Register", IBM Technical Disclosure, Aug. 1, 1982, TDB 08-82, pp. 1436-1438.
Bozman, "The Software Lookaside Buffer Reduces Search Overhead with Linked Lists", Communications of the ACM, Mar. 1984, vol. 27, No. 3, pp. 222-227.

* cited by examiner

*Primary Examiner* — Gary Portka
(74) *Attorney, Agent, or Firm* — Yee & Associates, P.C.; Joseph P. Abate

(57) ABSTRACT

A computer implemented method searches a unified translation lookaside buffer. Responsive to a request to access the unified translation lookaside buffer, a first order code within a first entry of a search priority configuration register is identified. A unified translation lookaside buffer is then searched according to the first order code for a hashed page entry. If the hashed page entry is not found when searching a unified translation lookaside buffer according to the first order code, a second order code is identified within a second entry of the search priority configuration register. The unified translation lookaside buffer is then searched according to the second order code for the hashed page entry.

16 Claims, 9 Drawing Sheets

FIG. 5

| PID | UTLB INDEX BIT | STID BITS | PAGE SIZE | | | | | | |
|---|---|---|---|---|---|---|---|---|---|
| | | | 4KB | 16KB | 64KB | 1MB | 16MB | 256MB | 1GB |
| PID≠0 | 7 | 15 | 19, -, 7 | 17, -, 7 | 15, 7 | 11, - | 7 | - | - |
| | 6 | 14 | 18, -, 6 | 16, -, 6 | 14, 6 | 10, - | 6 | - | - |
| | 5 | 13 | 17, -, 5 | 15, -, 5 | 13, 5 | 9, - | 5 | - | - |
| | 4 | 12 | 16, -, 4 | 14, -, 4 | 12, 4 | 8, - | 4 | - | - |
| | 3 | 11 | 15, 11, 3 | 13, -, 3 | 11, 3 | 7, 3 | 3 | 3 | - |
| | 2 | 10 | 14, 10, 2 | 12, -, 2 | 10, 2 | 6, 2 | 2 | 2 | - |
| | 1 | 9 | 13, 9, 1 | 11, 9, 1 | 9, 1 | 5, 1 | 1 | 1 | 1 |
| | 0 | 8 | 12, 8, 0 | 10, 8, 0 | 8, 0 | 4, 0 | 0 | 0 | 0 |
| PID=0 | 7 | - | 19, -, 7 | 17, -, 7 | 15, 7 | 11, - | 7 | - | - |
| | 6 | - | 18, -, 6 | 16, -, 6 | 14, 6 | 10, - | 6 | - | - |
| | 5 | - | 17, -, 5 | 15, -, 5 | 13, 5 | 9, - | 5 | - | - |
| | 4 | - | 16, -, 4 | 14, -, 4 | 12, 4 | 8, - | 4 | - | - |
| | 3 | - | 15, 11, 3 | 13, -, 3 | 11, 3 | 7, 3 | 3 | 3 | - |
| | 2 | - | 14, 10, 2 | 12, -, 2 | 10, 2 | 6, 2 | 2 | 2 | - |
| | 1 | - | 13, 9, 1 | 11, 9, 1 | 9, 1 | 5, 1 | 1 | 1 | 1 |
| | 0 | - | 12, 8, 0 | 10, 8, 0 | 8, 0 | 4, 0 | 0 | 0 | 0 |

500 TABLE
502 PAGE SIZE COLUMN
504 PAGE SIZE COLUMN
506 PAGE SIZE COLUMN
508 PAGE SIZE COLUMN
510 PAGE SIZE COLUMN
512 PAGE SIZE COLUMN
514 PAGE SIZE COLUMN

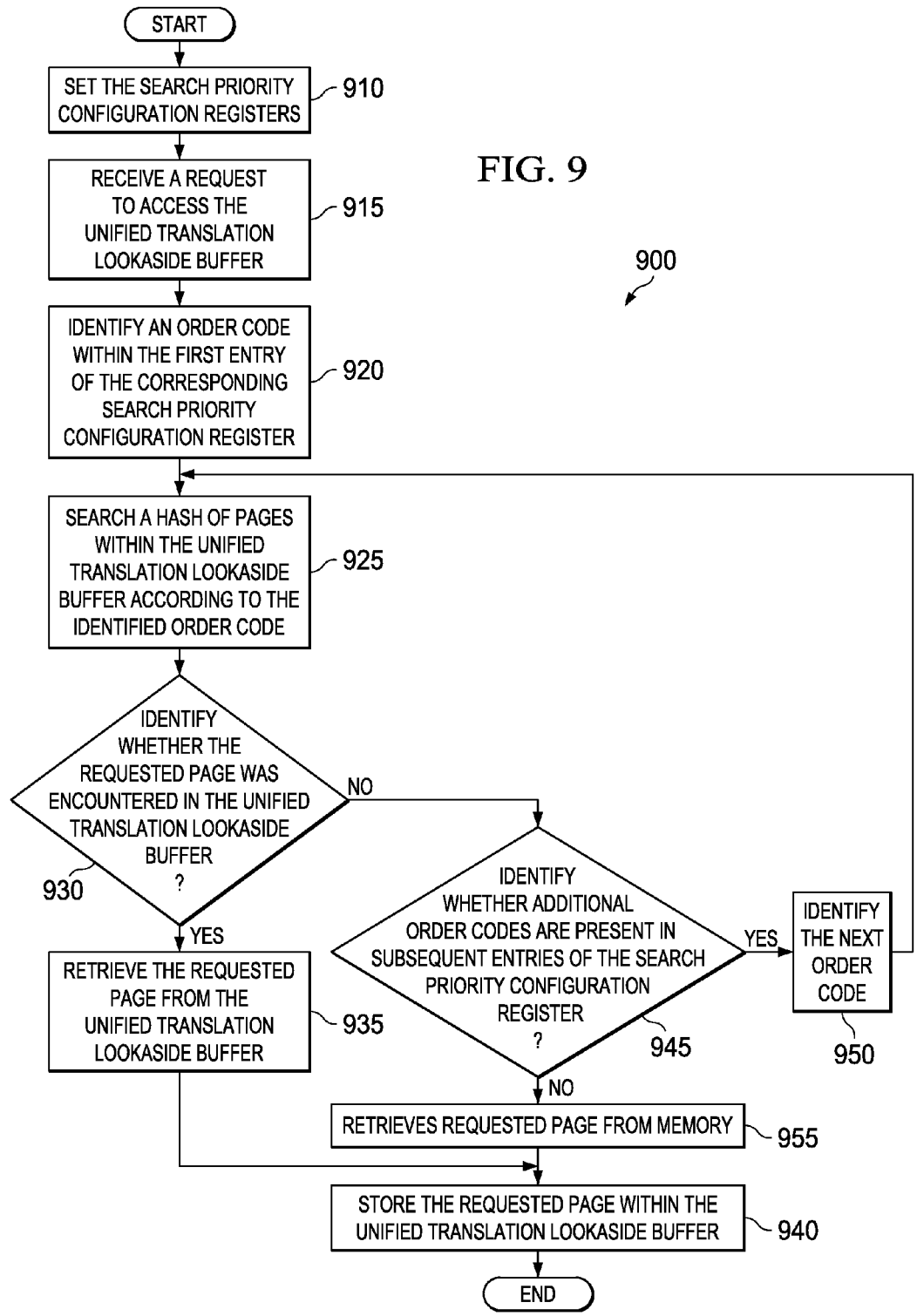

SOFTWARE ASSISTED TRANSLATION LOOKASIDE BUFFER SEARCH MECHANISM

BACKGROUND

1. Field

The disclosure relates generally to a computer implemented method, hardware enabled computer instructions, and a data processing system. More specifically, this disclosure relates to a computer implemented method, hardware enabled computer instructions, and a data processing system for a hardware controlled, software assist lookaside table search technique.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system, or each different operating system, directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

In software managed memory management systems, translation lookaside buffer look-up/search operations become problematic and slow process when translation lookaside buffer size becomes large. In embedded central processing unit core design, which focuses on power and size, software managed approach is more prevalent rather than hardware managed to reduce logic space.

A small translation lookaside buffer size can be simply implemented in a fully associative structure. However, as translation lookaside buffer size becomes larger, a set-associative structure becomes more a desirable implementation. The set-associative structure provides for faster performance within the translation lookaside buffer, due to the simultaneous comparisons of many entries that are required in full associative implementations.

However, because of the table size and many page size variations within a large translation lookaside buffer, even in a set-associative structure, look-up and search operations of the translation lookaside buffer become very process intensive. Operation of the large translation lookaside buffer often gets worse when the large translation lookaside buffer table index is hashed to reduce hot spots as seen in many applications.

SUMMARY

According to one embodiment of the present invention, a computer implemented method searches a unified translation lookaside buffer. Responsive to a request to access the unified translation lookaside buffer, a first order code within a first entry of a search priority configuration register is identified. A unified translation lookaside buffer is then searched according to the first order code for a hashed page entry. If the hashed page entry is not found when searching a unified translation lookaside buffer according to the first order code, a second order code is identified within a second entry of the search priority configuration register. The unified translation lookaside buffer is then searched according to the second order code for the hashed page entry.

BRIEF DESCRIPTION OF THE SEVERAL VIEWS OF THE DRAWINGS

FIG. 5 is a unified translation lookaside buffer set address generation hashing function according to an illustrative embodiment;

FIG. 9 a flowchart showing the dataflow for searching a unified translation lookaside buffer according to a search priority configuration register according to an illustrative embodiment.

DETAILED DESCRIPTION

Figure 1:
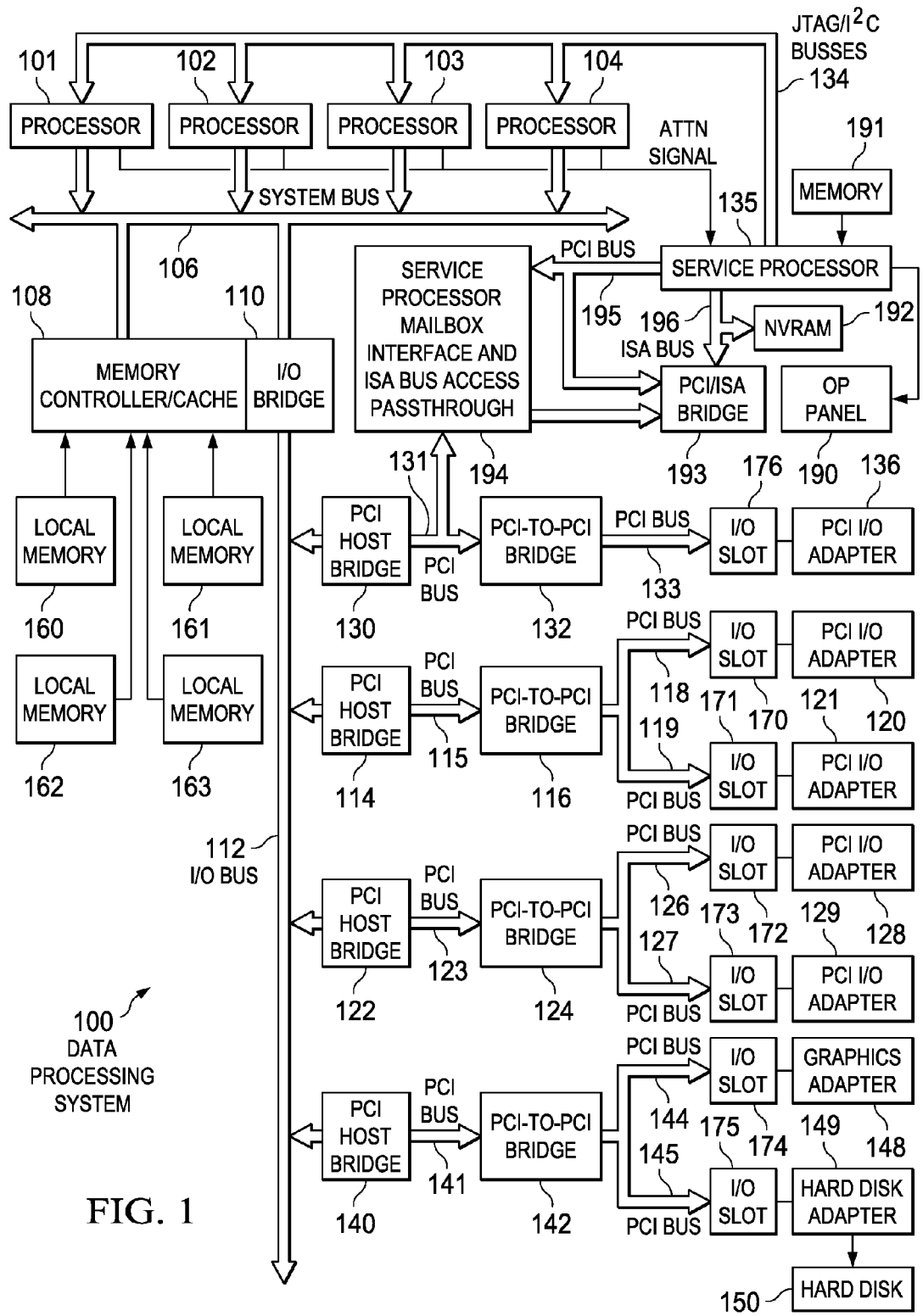
FIG. 1 is a block diagram of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to, or in place of, the hardware depicted. The depicted example is not meant to imply architectural limitations with respect to illustrative embodiments.

Figure 2:
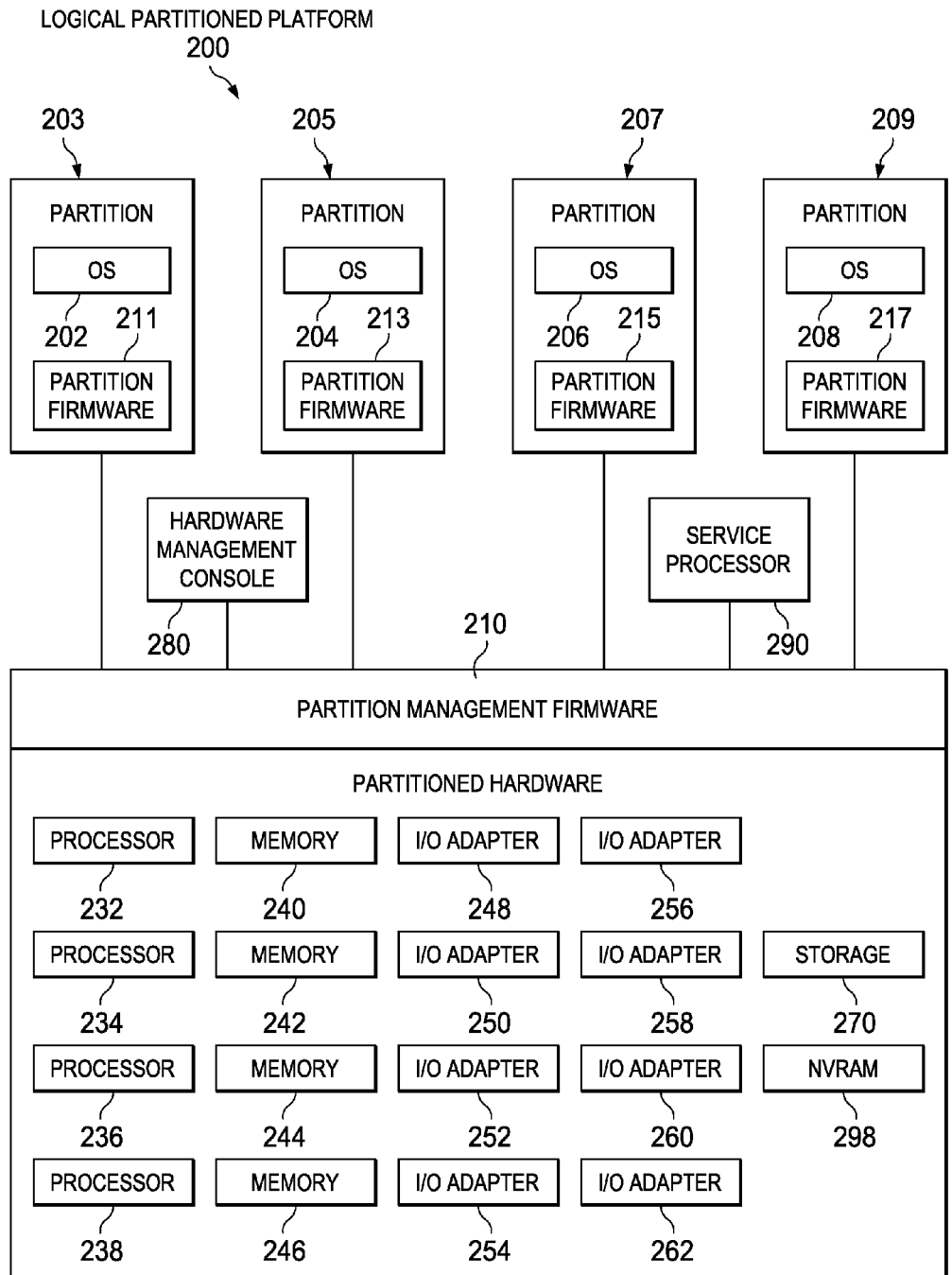
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 3:
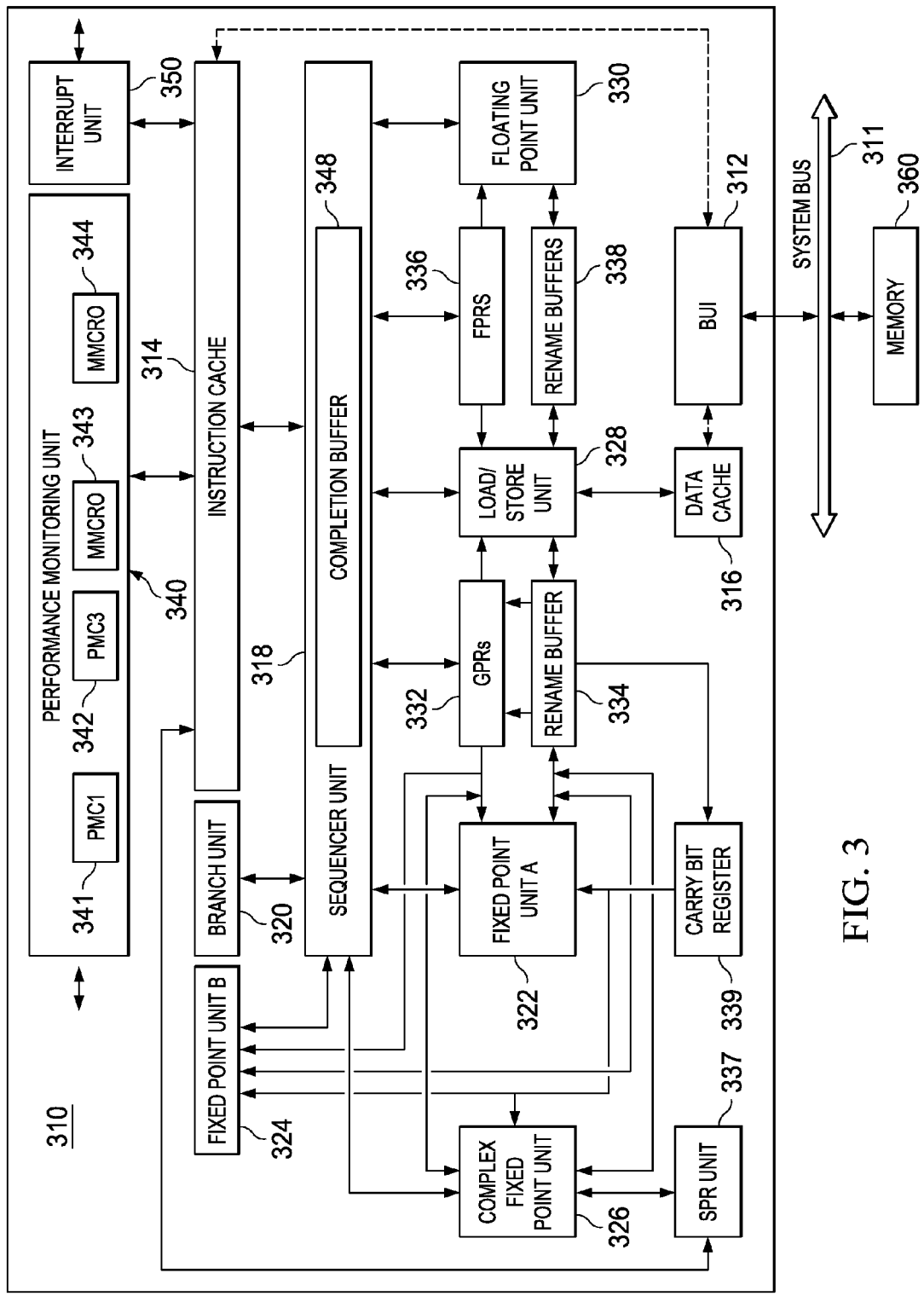
FIG. 3 is a block diagram of a processor system for processing information in which illustrative embodiments may be implemented.

Turning next to FIG. 3, a block diagram of a processor system for processing information is depicted in which illustrative embodiments may be implemented. Processor 310 may be implemented as one or more of processors 101, 102, 103, and 104 in FIG. 1.

In a preferred embodiment, processor 310 is a single integrated circuit superscalar microprocessor. Accordingly, as discussed further herein below, processor 310 includes various units, registers, buffers, memories, and other sections, all of which are formed by integrated circuitry. Also, in the preferred embodiment, processor 310 operates according to reduced instruction set computer ("RISC") techniques. As shown in FIG. 2, system bus 311 is connected to a bus interface unit ("BIU") 312 of processor 310. BIU 312 controls the transfer of information between processor 310 and system bus 311.

BIU 312 is connected to an instruction cache 314 and to data cache 316 of processor 310. Instruction cache 314 outputs instructions to sequencer unit 318. In response to such instructions from instruction cache 314, sequencer unit 318 selectively outputs instructions to other execution circuitry of processor 310.

In addition to sequencer unit 318, in the preferred embodiment, the execution circuitry of processor 310 includes multiple execution units, namely a branch unit 320, a fixed-point unit A ("FXUA") 322, a fixed-point unit B ("FXUB") 324, a complex fixed-point unit ("CFXU") 326, a load/store unit ("LSU") 328, and a floating-point unit ("FPU") 330. FXUA 322, FXUB 324, CFXU 326, and LSU 328 input their source operand information from general-purpose architectural registers ("GPRs") 332 and fixed-point rename buffers 334. Moreover, FXUA 322 and FXUB 324 input a "carry bit" from a carry bit ("CA") register 339. FXUA 322, FXUB 324, CFXU 326, and LSU 328 output results (destination operand information) of their operations for storage at selected entries in fixed-point rename buffers 334. Also, CFXU 326 inputs and outputs source operand information and destination operand information to and from special-purpose register processing unit ("SPR unit") 337.

FPU 330 inputs its source operand information from floating-point architectural registers ("FPRs") 336 and floating-point rename buffers 338. FPU 330 outputs results (destination operand information) of its operation for storage at selected entries in floating-point rename buffers 338.

In response to a Load instruction, LSU 328 inputs information from data cache 316 and copies such information to selected ones of rename buffers 334 and 338. If such information is not stored in data cache 316, then data cache 316 inputs (through BIU 312 and system bus 311) such information from a system memory 360 connected to system bus 311. Moreover, data cache 316 is able to output (through BIU 312 and system bus 311) information from data cache 316 to system memory 360 connected to system bus 311. In response to a Store instruction, LSU 328 inputs information from a selected one of GPRs 332 and FPRs 336 and copies such information to data cache 316.

Sequencer unit 318 inputs and outputs information to and from GPRs 332 and FPRs 336. From sequencer unit 318, branch unit 320 inputs instructions and signals indicating a present state of processor 310. In response to such instructions and signals, branch unit 320 outputs (to sequencer unit 318) signals indicating suitable memory addresses storing a sequence of instructions for execution by processor 310. In response to such signals from branch unit 320, sequencer unit 318 inputs the indicated sequence of instructions from instruction cache 314. If one or more of the sequence of instructions is not stored in instruction cache 314, then instruction cache 314 inputs (through BIU 312 and system bus 311) such instructions from system memory 360 connected to system bus 311.

In response to the instructions input from instruction cache 314, sequencer unit 318 selectively dispatches the instructions to selected ones of execution units 320, 322, 324, 326, 328, and 330. Each execution unit executes one or more instructions of a particular class of instructions. For example, FXUA 322 and FXUB 324 execute a first class of fixed-point mathematical operations on source operands, such as addition, subtraction, ANDing, ORing and XORing. CFXU 326 executes a second class of fixed-point operations on source operands, such as fixed-point multiplication and division. FPU 330 executes floating-point operations on source operands, such as floating-point multiplication and division.

As information is stored at a selected one of rename buffers 334, such information is associated with a storage location (e.g. one of GPRs 332 or carry bit (CA) register 342) as specified by the instruction for which the selected rename buffer is allocated. Information stored at a selected one of rename buffers 334 is copied to its associated one of GPRs 332 (or CA register 342) in response to signals from sequencer unit 318. Sequencer unit 318 directs such copying of information stored at a selected one of rename buffers 334 in response to "completing" the instruction that generated the information. Such copying is called "writeback."

As information is stored at a selected one of rename buffers 338, such information is associated with one of FPRs 336. Information stored at a selected one of rename buffers 338 is copied to its associated one of FPRs 336 in response to signals from sequencer unit 318. Sequencer unit 318 directs such copying of information stored at a selected one of rename buffers 338 in response to "completing" the instruction that generated the information.

Processor 310 achieves high performance by processing multiple instructions simultaneously at various ones of execution units 320, 322, 324, 326, 328, and 330. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 318 selectively inputs (from instruction cache 314) one or more instructions from one or more memory addresses storing the sequence of instructions discussed further hereinabove in connection with branch unit 320, and sequencer unit 318.

In the decode stage, sequencer unit 318 decodes up to four fetched instructions.

In the dispatch stage, sequencer unit 318 selectively dispatches up to four decoded instructions to selected (in response to the decoding in the decode stage) ones of execution units 320, 322, 324, 326, 328, and 330 after reserving rename buffer entries for the dispatched instructions' results (destination operand information). In the dispatch stage, operand information is supplied to the selected execution units for dispatched instructions. Processor 310 dispatches instructions in order of their programmed sequence.

In the execute stage, execution units execute their dispatched instructions and output results (destination operand information) of their operations for storage at selected entries in rename buffers 334 and rename buffers 338 as discussed further hereinabove. In this manner, processor 310 is able to execute instructions out-of-order relative to their programmed sequence.

In the completion stage, sequencer unit 318 indicates an instruction is "complete." Processor 310 "completes" instructions in order of their programmed sequence.

In the writeback stage, sequencer unit 318 directs the copying of information from rename buffers 334 and 338 to GPRs 332 and FPRs 336, respectively. Sequencer unit 318 directs such copying of information stored at a selected rename buffer. Likewise, in the writeback stage of a particular instruction, processor 310 updates its architectural states in response to the particular instruction. Processor 310 processes the respective "writeback" stages of instructions in order of their programmed sequence. Processor 310 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 326) may require more than one cycle. Accordingly, a variable delay may occur between a particular instruction's execution and completion stages in response to the variation in time required for completion of preceding instructions.

Completion buffer 348 is provided within sequencer 318 to track the completion of the multiple instructions which are being executed within the execution units. Upon an indication that an instruction or a group of instructions have been completed successfully, in an application specified sequential order, completion buffer 348 may be utilized to initiate the transfer of the results of those completed instructions to the associated general-purpose registers.

In addition, processor 310 also includes performance monitor unit 340, which is connected to instruction cache 314 as well as other units in processor 310. Operation of processor 310 can be monitored utilizing performance monitor unit 340, which in this illustrative embodiment is a software-accessible mechanism capable of providing detailed information descriptive of the utilization of instruction execution resources and storage control. Although not illustrated in FIG. 3, performance monitor unit 340 is coupled to each functional unit of processor 310 to permit the monitoring of all aspects of the operation of processor 310, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 340 includes an implementation-dependent number (e.g., 2-8) of counters 341-342, labeled PMC1 and PMC2, which are utilized to count occurrences of selected events. Performance monitor unit 340 further includes at least one monitor mode control register (MMCR). In this example, two control registers, MMCRs 343 and 344 are present that specify the function of counters 341-342. Counters 341-342 and MMCRs 343-344 are preferably implemented as SPRs that are accessible for read or write via MFSPR (move from SPR) and MTSPR (move to SPR) instructions executable by CFXU 326. However, in one alternative embodiment, counters 341-342 and MMCRs 343-344 may be implemented simply as addresses in I/O space. In another alternative embodiment, the control registers and counters may be accessed indirectly via an index register. This embodiment is implemented in the IA-64 architecture in processors from Intel Corporation.

The various components within performance monitoring unit 340 may be used to generate data for performance analysis. Depending on the particular implementation, the different components may be used to generate trace data. In other illustrative embodiments, performance unit 340 may provide data for time profiling with support for dynamic address to name resolution.

Additionally, processor 310 also includes interrupt unit 350, which is connected to instruction cache 314. Additionally, although not shown in FIG. 2, interrupt unit 350 is connected to other functional units within processor 310. Interrupt unit 350 may receive signals from other functional units and initiate an action, such as starting an error handling or trap process. In these examples, interrupt unit 350 is employed to generate interrupts and exceptions that may occur during execution of a program.

Figure 4:
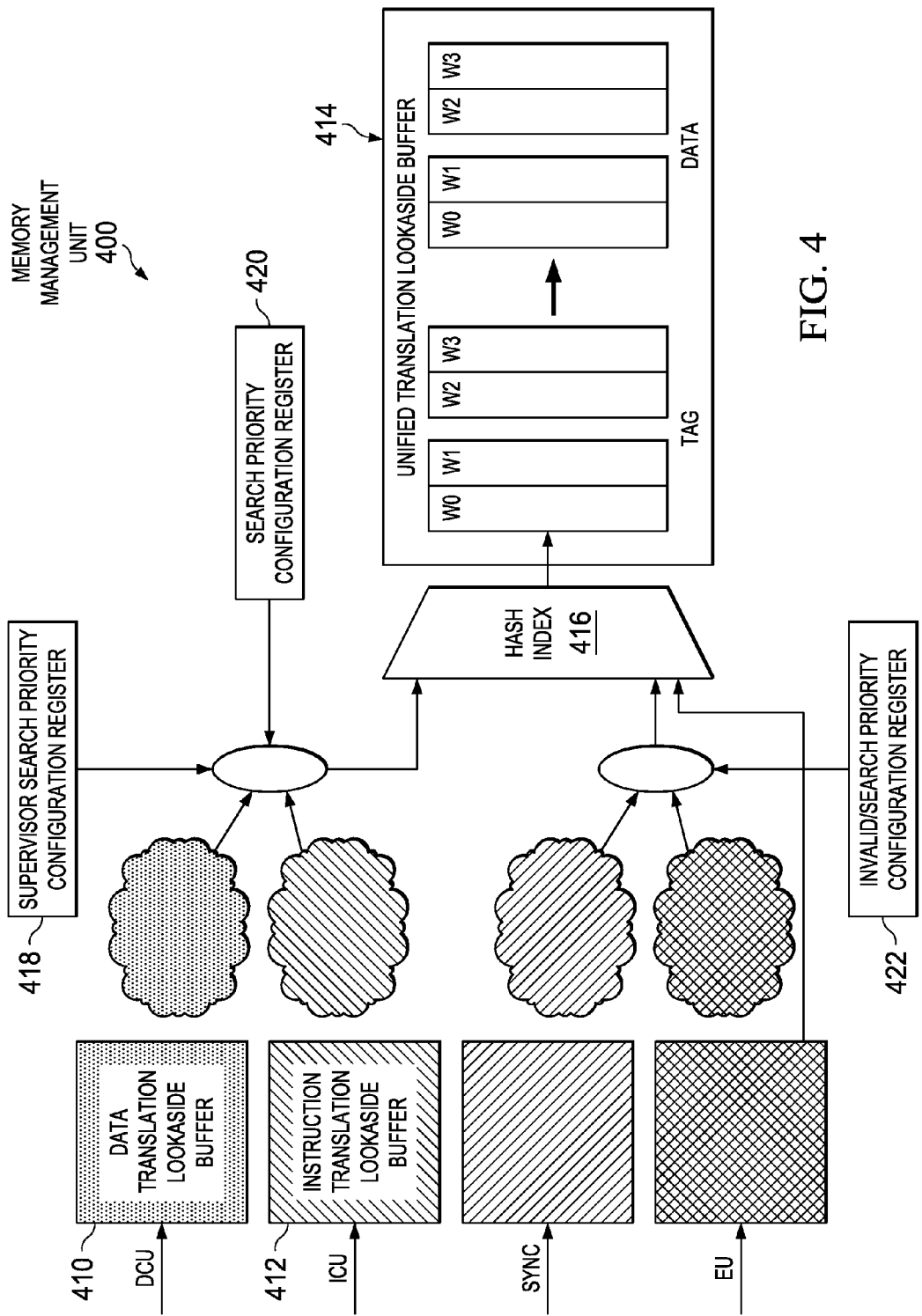
FIG. 4 is a block diagram of a memory management unit in accordance with an illustrative embodiment of the present invention.

Referring now to FIG. 4, a block diagram of a memory management unit is depicted in accordance with an illustrative embodiment of the present invention. Memory management unit 400 is a computer hardware component responsible for handling accesses to memory requested by a processor, such as processor 310 of FIG. 3. Memory management unit 400 provides memory access protection and virtual-to-real memory address translation.

An illustrative embodiment described herein provides a computer implemented method for searching a unified translation lookaside buffer. Responsive to a request to access the unified translation lookaside buffer, a first order code within a first entry of a search priority configuration register is identified. A unified translation lookaside buffer is then searched according to the first order code for a hashed page entry. If the hashed page entry is not found when searching a unified translation lookaside buffer according to the first order code, a second order code is identified within a second entry of the search priority configuration register. The unified translation lookaside buffer is then searched according to the second order code for the hashed page entry.

Memory management module 400 includes data translation lookaside buffer 410 (dTLB) and instruction translation lookaside buffer 412 (iTLB). Data translation lookaside buffer 410 is a shadow translation lookaside buffer that caches entries for the data cache, such data cache 316 of FIG. 3. Data translation lookaside buffer 410 contains memory pages that have been read out of unified translation lookaside buffer 414 for use by the data cache. Data translation lookaside buffer 410 can contain any variety of page sizes. In an illustrative embodiment, data translation lookaside buffer 410 is an 8-entry lookaside buffer.

Instruction translation lookaside buffer 412 is a shadow translation lookaside buffer that caches entries for the instruction cache, such instruction cache 314 of FIG. 3. Instruction translation lookaside buffer 412 contains memory pages that have been read out of the unified translation lookaside buffer 414 for use by the instruction cache. Instruction translation lookaside buffer 412 can contain any variety of page sizes. In an illustrative embodiment, instruction translation lookaside buffer 412 is an 8-entry lookaside buffer.

If the requested memory page is not found within either data translation lookaside buffer 410 (dTLB) and instruction translation lookaside buffer 412, memory management unit attempts to find the requested page within unified translation lookaside buffer 414. In an illustrative embodiment, unified translation lookaside buffer 414 is a software managed translation lookaside buffer. Paging memory into and out of unified translation lookaside buffer 414 along with address translations and flushing of unified translation lookaside buffer 414 are under the control of software. In one illustrative embodiment, unified translation lookaside buffer 414 is a software managed 1024-entry lookaside buffer.

Unified translation lookaside buffer 414 can contain memory pages having various page sizes. In one illustrative embodiment, unified translation lookaside buffer 414 is capable of caching memory pages having sizes of 4 kilobytes, 16 kilobytes, 64 kilobytes, 1 megabyte, 16 megabytes, 256 megabytes, and 1 gigabyte.

In order to support the large sized unified translation lookaside buffer 414, memory management unit utilizes hash index 416. Hash index 416 increases unified translation lookaside buffer 414 usage and provides better distribution throughout unified translation lookaside buffer 414 than would an unhashed index. In one illustrative embodiment, the hash index utilizes an XOR-based hash function. The effective address, process ID and address space bit of the memory page are hashed using the hash function to provide an index address within unified translation lookaside buffer 414.

Memory management module 400 also includes supervisor search priority configuration register 418, user search priority configuration register 420, and invalidate/search priority configuration register 422. Each of supervisor search priority configuration register 418, user search priority configuration register 420, and invalidate/search priority configuration register 422 sets page-size order search priorities of unified translation lookaside buffer 414. In an illustrative embodiment, each of supervisor search priority configuration register 418, user search priority configuration register 420, and invalidate/search priority configuration register 422 is a 32-bit, 7-entry register.

Referring now to FIG. 5, a unified translation lookaside buffer set address generation hashing function is shown according to an illustrative embodiment. Table 500 shows the hashing function for an 8-bit unified translation lookaside buffer index according to an illustrative embodiment. Table 500 is a graphical display of a hash function that creates hashed entries for a hash index, such as hash index 416 of FIG. 4.

In order to support the large size of the unified translation lookaside buffer, the illustrative embodiments utilize a hash index. The hash index increases usage of the unified translation lookaside buffer and provides better distribution throughout the unified translation lookaside buffer than would an unhashed index. In one illustrative embodiment, the hash index utilizes an XOR-based hash function. The effective address, process ID and address space bit of the memory page are hashed using the hash function to provide an index address within a unified translation lookaside buffer, such as unified translation lookaside buffer 414 of FIG. 4.

In one illustrative embodiment, a 4 kilobyte page has a 16-bit process identifier a 4 kilobyte page size identification and a 20-bit effective address. The hash function hashes the page identification and effective address into an 8-bit unified translation lookaside buffer address as follows:

UTLB index-address-bit-7=PID[15] XOR EA[19] XOR EA[7],
UTLB index-address-bit-6=PID[14] XOR EA[18] XOR EA[6],
UTLB index-address-bit-5=PID[13] XOR EA[17] XOR EA[5],
UTLB index-address-bit-4=PID[12] XOR EA[16] XOR EA[4],
UTLB index-address-bit-3=PID[11] XOR EA[15] XOR EA[11] XOR EA[3],
UTLB index-address-bit-2=PID[10] XOR EA[14] XOR EA[10] XOR EA[2],
UTLB index-address-bit-1=PID[9] XOR EA[13] XOR EA[9] XOR EA[1],
UTLB index-address-bit-0=PID[8] XOR EA[12] XOR EA[8] XOR EA[0], wherein:
PID is the process identifier for the hashed page;
EA is the effective address for the hashed page; and
[n] is a bit position within either the 16-bit process identifier or the 20-bit effective address.

Hash results for the 4 kilobyte page size is summarized in 4 KB page size column 502. Similar to the above, hashed addresses for a 16 kilobyte page size is summarized in 16 KB page size column 504. Hashed addresses for a 64 kilobyte page size is summarized in 64 KB page size column 506. Hashed addresses for a 1 megabyte page size is summarized in 1 MB page size column 508. Hashed addresses for a 16 megabyte page size is summarized in 16 MB page size column 510. Hashed addresses for a 256 megabyte page size is summarized in 256 MB page size column 512. Hashed addresses for a 1 gigabyte page size is summarized in 1 GB page size column 514.

Figure 6:
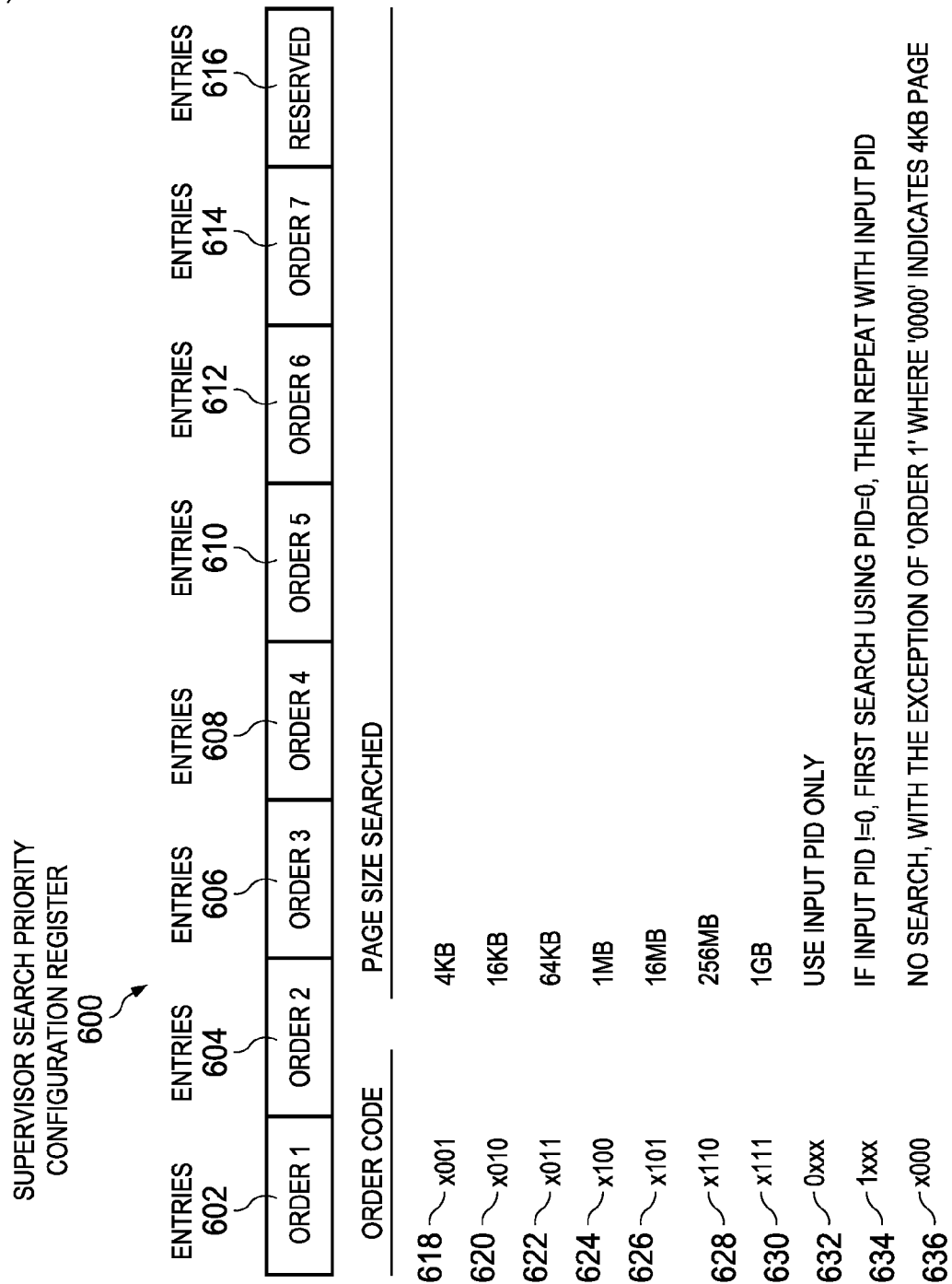
FIG. 6 is a supervisor search priority configuration register according to an illustrative embodiment.

Referring now to FIG. 6, a supervisor search priority configuration register is shown according to an illustrative embodiment. Supervisor search priority configuration register 600 is a hardware register that sets page-size order search priorities of a unified translation lookaside buffer. Supervisor search priority configuration register 600 can be supervisor search priority configuration register 420 of FIG. 4.

In an illustrative embodiment, supervisor search priority configuration register 600 is a 32-bit, 7-entry register. Each of entries 602-616 within the register is a 4-bit entry. Bits within the entry are set by the operating system to indicate a preferred page-size search order for searching the unified translation lookaside buffer in response to a page miss of a supervisor instruction or data within either of the instruction translation lookaside buffer 412 of FIG. 4, or the data translation lookaside buffer 410 of FIG. 4.

One of order codes 618-636 is input into each of entries 602-616. Each of order codes 618-636 correspond to a specific page size that can be stored within the memory management unit, such as memory management unit 400 of FIG. 4. More specifically, each of order codes 618-636 correspond to a specific page size that can be stored within the unified translation lookaside buffer, such as unified translation lookaside buffer 414 of FIG. 4. By setting a preferred one of order codes 618-636 earlier in the entries 602-616, supervisor search priority configuration register 600 ensures that page sizes corresponding to order codes 618-636 having numerically lower entries within entries 602-616 are searched preferentially over page sizes corresponding to order codes 618-636 having numerically higher entries within entries 602-616.

Thus, in response to a miss for a supervisor program called memory page within one of data translation lookaside buffer or instruction translation lookaside buffer, hashes of pages within the unified translation lookaside buffer are searched according to the search order indicated by order codes 618-636 within entries 602-616. In one illustrative embodiment, an entry of order code 618 "001" within entry 602 indicates that the hash of 4 KB page sizes should be searched first in response to a miss for a supervisor program called memory page within one of data translation lookaside buffer or instruction translation lookaside buffer. An entry of order code 620 "010" within entry 604 indicates that the hash of 16 KB page sizes should be searched second in response to a miss for a supervisor program called memory page within one of data translation lookaside buffer or instruction translation lookaside buffer. According to this embodiment, the hash of 16 KB page sizes is searched only after the search of the hash of 4 KB page sizes is completed.

Thus, supervisor search priority configuration register 600 can predetermine which page size hash within the unified translation lookaside buffer is preferentially searched in response to a miss for a supervisor program called memory page within one of data translation lookaside buffer or instruction translation lookaside buffer.

Order codes 632 and 634 correspond to a first bit of entries 602-616. Order codes 632 and 634 are used to indicate whether the search of the unified translation lookaside buffer should be limited only to those pages cached for current process identifier, or whether the search should also include global pages accessible to all process identifiers.

Because part of the process identifier is used to hash entries within the unified translation lookaside buffer, as indicated in FIG. 5, it would be possible for a global page called by a supervisor program with a non-zero process identifier to exist in the unified translation lookaside buffer, but not be found since the index address would be incorrect. Order codes 632 and 634 help to alleviate this possibility by forcing an additional search for page sizes that correspond to a page size for global pages. Order code 632 "0xxx" is utilized when the indicated page size has entries only with matching current process identifiers, and not for global pages. Order code 632 "0xxx" therefore indicates that the unified translation lookaside buffer should be searched once using the current process identifier in the hash. Order code 634 "1xxx" is utilized when there are entries with both matching current process identifiers, and global pages. Global pages have process identifier value of 0. Order code 634 "1xxx" therefore indicates that the unified translation lookaside buffer should be searched once using process identifier value of 0, and then searched a second time using the current process identifier in the hash function.

Order code 636 can be used to exclude further searches of page sizes. An entry of "x000" therefore indicates that no search of the unified translation lookaside buffer should be performed as indicated by that one of entries 602-616. Therefore, if a particular data processing system utilizes only supervisor program pages of a few particular sizes, user supervisor search priority configuration register 600 can be configured to exclude the searching of the unified translation lookaside buffer for a hash of those unused page sizes.

Figure 7:
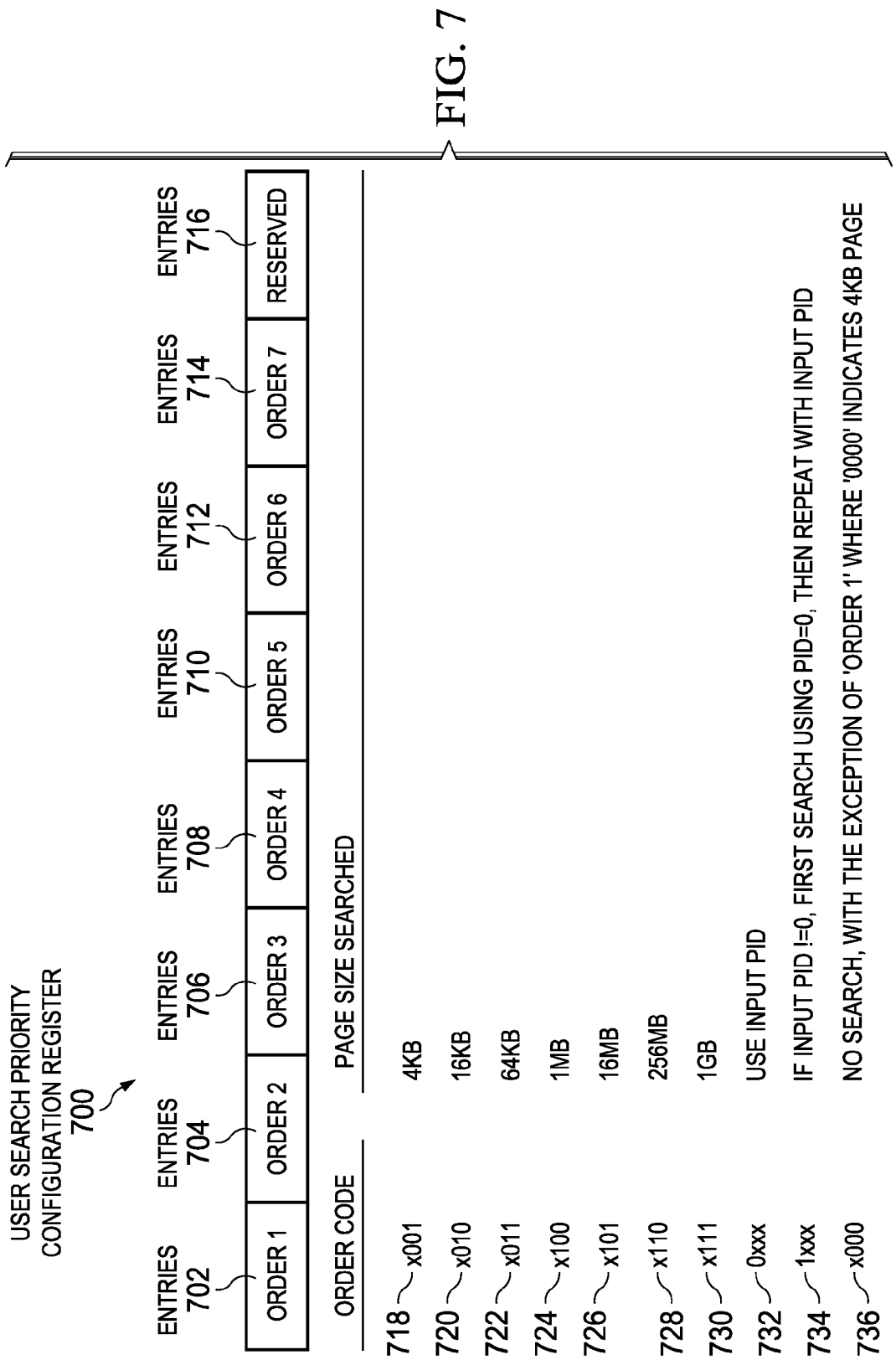
FIG. 7 is a user search priority configuration register according to an illustrative embodiment.

Referring now to FIG. 7, a user search priority configuration register is shown according to an illustrative embodiment. User search priority configuration register 700 is a hardware register that sets page-size order search priorities of a unified translation lookaside buffer. User search priority configuration register 700 can be user search priority configuration register 600 of FIG. 6.

In an illustrative embodiment, user search priority configuration register 700 is a 32-bit, 7-entry register. Each of entries 702-716 within the register is a 4-bit entry. Bits within the entry are set by the operating system to indicate a preferred page-size search order for searching the unified translation lookaside buffer in response to a page miss of a user instruction or data within either of the instruction translation lookaside buffer 412 of FIG. 4, or the data translation lookaside buffer 410 of FIG. 4.

One of order codes 718-736 is input into each of entries 702-716. Each of order codes 718-736 correspond to a specific page size that can be stored within the memory management unit, such as memory management unit 400 of FIG. 4. More specifically, each of order codes 718-736 correspond to a specific page size that can be stored within the unified translation lookaside buffer, such as unified translation lookaside buffer 414 of FIG. 4. By setting a preferred one of order codes 718-736 earlier in the entries 702-716, user search priority configuration register 700 ensures that page sizes corresponding to order codes 718-736 having numerically lower entries within entries 702-716 are searched preferentially over page sizes corresponding to order codes 718-736 having numerically higher entries within entries 702-716.

Thus, in response to a miss for a user program called memory page within one of data translation lookaside buffer or instruction translation lookaside buffer, hashes of pages within the unified translation lookaside buffer are searched according to the search order indicated by order codes 718-736 within entries 702-716. In one illustrative embodiment, an entry of order code 718 "001" within entry 702 indicates that the hash of 4 KB page sizes should be searched first in response to a miss for a user program called memory page within one of data translation lookaside buffer or instruction translation lookaside buffer. An entry of order code 720 "010" within entry 704 indicates that the hash of 16 KB page sizes should be searched second in response to a miss for a user program called memory page within one of data translation lookaside buffer or instruction translation lookaside buffer. According to this embodiment, the hash of 16 KB page sizes is searched only after the search of the hash of 4 KB page sizes is completed. Thus, user search priority configuration register 700 can predetermine which page size hash within the unified translation lookaside buffer is preferentially searched in response to a miss for a user program called memory page within one of data translation lookaside buffer or instruction translation lookaside buffer.

Order codes 732 and 734 correspond to a first bit of entries 702-716. Order codes 732 and 734 are used to indicate whether the search of the unified translation lookaside buffer should be limited only to those pages cached for current process identifier, or whether the search should also include global pages accessible to all process identifiers.

Because part of the process identifier is used to hash entries within the unified translation lookaside buffer as indicated in FIG. 5, it would be possible for a global page called by a user program with a non-zero process identifier to exist in the unified translation lookaside buffer, but not be found since the index address would be incorrect. Order codes 732 and 734 help to alleviate this possibility by forcing an additional search for page sizes that correspond to a page size for global pages. Order code 732 "0xxx" is utilized when the indicated page size has entries only with matching process identifiers, and not for global pages. Order code 732 "0xxx" therefore indicates that the unified translation lookaside buffer should be searched once using the current process identifier in the hash. Order code 734 "1xxx" is utilized when there are entries with both current process identifiers, and global pages. Global pages have process identifier value of 0. Order code 734 "1xxx" therefore indicates that the unified translation lookaside buffer should be searched once using the process identifier 0, and then searched a second time using the current process identifier in the hash function.

Order code 736 can be used to exclude further searches of page sizes. An entry of "x000" therefore indicates that no search of the unified translation lookaside buffer should be performed as indicated by that one of entries 702-716. Therefore, if a particular data processing system utilizes only user program pages of a few particular sizes, user search priority configuration register 700 can be configured to exclude from the searching of the unified translation lookaside buffer for a hash of those unused page sizes.

Figure 8:
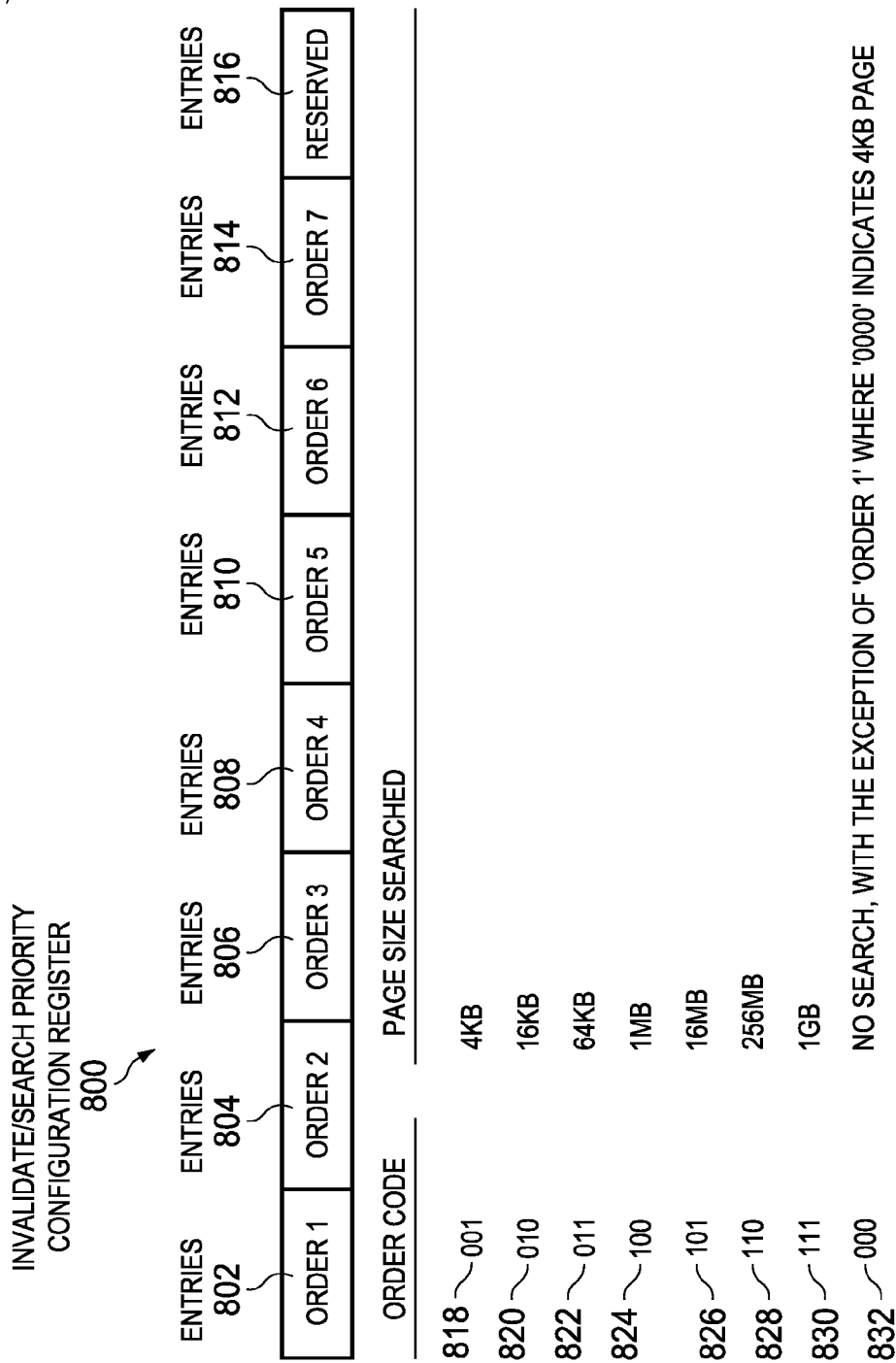
FIG. 8 is an invalidate/search priority configuration register according to an illustrative embodiment.

Referring now to FIG. 8, an invalidate/search priority configuration register is shown according to an illustrative embodiment. Invalidate/search search priority configuration register 800 is a hardware register that sets page-size order search priorities of a unified translation lookaside buffer for local and snooped invalidate requests, and for search requests, from an execution unit. Invalidate/search priority configuration register 800 can be invalidate/search priority configuration register 422 of FIG. 4.

In an illustrative embodiment, invalidate/search priority configuration register 800 is a 32-bit, 7-entry register. Each of entries 802-816 within the register is a 3-bit entry. Bits within the entry are set by the operating system during boot time to indicate a preferred page-size search order for searching the unified translation lookaside buffer in response to a page miss of a search, or invalidate request from an execution unit, such as one of execution units 320, 322, 324, 326, 328, and 330 of FIG. 3.

One of order codes 818-832 is input into each of entries 802-816. Each of order codes 818-832 correspond to a specific page size that can be stored within the memory management unit, such as memory management unit 400 of FIG. 4. More specifically, each of order codes 818-832 correspond to a specific page size that can be stored within the unified translation lookaside buffer, such as unified translation lookaside buffer 414 of FIG. 4. By setting a preferred one of order codes 818-832 having numerically lower entries within entries 802-816, invalidate/search priority configuration register 800 ensures that page sizes corresponding to order codes 818-832 entered earlier within entries 802-816 are searched preferentially over page sizes corresponding to order codes 818-832 having numerically lower entries within entries 802-816.

Thus, in response to a miss for a user program called memory page within one of data translation lookaside buffer or instruction translation lookaside buffer, hashes of pages within the unified translation lookaside buffer are searched according to the search order indicated by order codes 818-832 within entries 802-816. In one illustrative embodiment, an entry of order code 818 "001" within entry 802 indicates that the hash of 4 KB page sizes should be searched first in response to a miss for a user program called memory page within one of data translation lookaside buffer or instruction translation lookaside buffer. An entry of order code 820 "010" within entry 804 indicates that the hash of 16 KB page sizes should be searched second in response to a miss for a user program called memory page within one of data translation lookaside buffer or instruction translation lookaside buffer. According to this embodiment, the hash of 16 KB page sizes is searched only after the search of the hash of 4 KB page sizes is completed.

Thus, invalidate/search priority configuration register 800 can predetermine which page size hash within the unified translation lookaside buffer is preferentially searched in response to a miss for a user program called memory page within one of data translation lookaside buffer or instruction translation lookaside buffer.

Order code 832 can be used to exclude further searches of page sizes. An entry of "000" therefore indicates that no search of the unified translation lookaside buffer should be performed as indicated by that one of entries 802-816. Therefore, if a particular data processing system utilizes only search and invalidate requests for pages of a few particular sizes, user search priority configuration register 800 can be configured to exclude from the searching of the unified translation lookaside buffer for a hash of those unused page sizes.

Referring now to FIG. 9, a flowchart showing the dataflow for searching a unified translation lookaside buffer according to a search priority configuration register is shown according to an illustrative embodiment. Process 900 is a software assisted process, executing in hardware components, such as memory management module 400 of FIG. 4.

Process 900 begins by setting the search priority configuration registers (step 910). There are three sets of registers to control unified translation lookaside buffer look-up/search priority. Two registers, the supervisor search priority configuration register and user search priority configuration register, are used for misses in the instruction translation lookaside buffer and the data translation lookaside buffer. The supervisor search priority configuration register is supervisor search priority configuration register 600 of FIG. 6. The supervisor search priority configuration register is assigned for supervisor/privileged mode. The user search priority configuration register is user search priority configuration register 700 of FIG. 7. The user search priority configuration register is assigned for Problem/User mode. An invalidate/search priority configuration register is used for local search and invalidate operations of the translation lookaside buffer, as well as for incoming snoops resulting from external invalidate operations of the translation lookaside buffer. The invalidate/search priority configuration register is invalidate/search priority configuration register 800 of FIG. 8. Separating the search registers into supervisor, user and search registers reduces the number of pages searched to the minimum, improving performance by reducing search latency. All three sets of registers will be written by software when the unified translation lookaside buffer is set up. All three sets of registers can be updated by software as page sizes are added to or removed from the unified translation lookaside buffer.

Entries within each of the registers are filled with 3-bit and 4-bit order codes, such as order codes 618-636 of FIG. 6, order codes 718-736 of FIG. 7, and order codes 818-832 of FIG. 8. Each of the order codes corresponds to a specific page size that can be stored within the memory management unit, such as memory management unit 400 of FIG. 4. More specifically, each of the order codes corresponds to a specific page size that can be stored within the unified translation lookaside buffer, such as unified translation lookaside buffer 414 of FIG. 4. By setting a preferred one of the order codes earlier in the entries of the registers, process 900 ensures that page sizes corresponding to order codes entered into earlier register entries are searched preferentially over page sizes corresponding to order codes entered into later register entries.

At a later time, process 900 receives a request to access the unified translation lookaside buffer (step 915). The request to access the unified translation lookaside buffer can be in response to a miss in the instruction cache translation lookaside buffer, such as a lookaside buffer for instruction cache 314 of FIG. 3, a miss in the data cache translation lookaside buffer, such as a lookaside buffer for data cache 316 of FIG. 3, or a local or snooped search and invalidate request from an execution unit, such as one of execution units 320, 322, 324, 326, 328, and 330 of FIG. 3.

Responsive to receiving the request, process 900 identifies an order code within the first entry of the corresponding search priority configuration register (step 920). The first order code within the first entry corresponds to a specific page size that can be stored within the memory management unit, such as memory management unit 400 of FIG. 4. More specifically, the first order code corresponds to a specific page size that can be stored within the unified translation lookaside buffer, such as unified translation lookaside buffer 414 of FIG. 4. The first order code within the first entry of the corresponding search priority configuration register indicates a hash of a specific page size and process identifier for either a current process identifier or a global process identifier that is to be searched first.

Responsive to identifying the order code, process 900 searches a hash of pages within the unified translation lookaside buffer according to the identified order code (step 925). Hashes of additional pages are searched based on when a corresponding entry within the search priority configuration register is encountered.

Process 900 then identifies whether the requested page was encountered in the unified translation lookaside buffer (step 930). Responsive to locating requested page was encountered in the unified translation lookaside buffer ("yes" at step 930), process 900 retrieves the requested page from the unified translation lookaside buffer (step 935). If the search was performed in response to a data cache or instruction cache translation lookaside buffer miss, the data cache or instruction cache stores the requested page within the unified translation lookaside buffer (step 940), with the process terminating thereafter.

Returning now to step 930, responsive to not locating requested page was encountered in the unified translation lookaside buffer ("no" at step 930), process 900 identifies whether additional order codes are present in subsequent entries of the search priority configuration register (step 945). If additional order codes are present in subsequent entries of the search priority configuration register ("yes" at step 945), process 900 identifies the next order code (step 950). Process then returns to step 925, and performs a search of the unified translation lookaside buffer according to the order code identified in step 950.

Returning now to step 945, if no additional order codes are present in subsequent entries of the search priority configuration register ("no" at step 945), process 900 retrieves requested page translation from memory (step 955). The memory can be memory such as NVRAM storage 192 of FIG. 1 or system memory 360 of FIG. 3. If the search was performed in response to a data cache or instruction cache translation lookaside buffer miss, the requested page is stored within the unified translation lookaside buffer (step 940), with the process terminating thereafter.

An illustrative embodiment described herein provides a computer implemented method for searching a unified translation lookaside buffer. Responsive to a request to access the unified translation lookaside buffer, a first order code within a first entry of a search priority configuration register is identified. A unified translation lookaside buffer is then searched according to the first order code for a hashed page entry. If the hashed page entry is not found when searching a unified translation lookaside buffer according to the first order code, a second order code is identified within a second entry of the search priority configuration register. The unified translation lookaside buffer is then searched according to the second order code for the hashed page entry.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in hardware, assisted by software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for searching a unified translation lookaside buffer, the computer implemented method comprising:
   responsive to a request to access the unified translation lookaside buffer, identifying a first order code within a first entry of a search priority configuration register;
   responsive to identifying the first order code, searching the unified translation lookaside buffer according to the first order code for a hashed page entry;
   responsive to not locating the hashed page entry when searching the unified translation lookaside buffer according to the first order code, identifying a second order code within a second entry of the search priority configuration register; and
   responsive to identifying the second order code, searching the unified translation lookaside buffer according to the second order code for the hashed page entry.

2. The computer implemented method of claim 1, wherein the request to access the unified translation lookaside buffer is a request in response to one of the group consisting of a cache miss in a shadow translation lookaside buffer, a local or snooped read request from an execution unit, a local or snooped search request from the execution unit, and a local or snooped invalidate request from the execution unit.

3. The computer implemented method of claim 1, wherein the first order code corresponds to a first page size that is stored within the unified translation lookaside buffer, and wherein the second order code corresponds to a second page size that is stored within the unified translation lookaside buffer.

4. The computer implemented method of claim 2, wherein the request to access the unified translation lookaside buffer is a request in response to the cache miss in a shadow translation lookaside buffer, the method further comprising:
   responsive to identifying the first order code, searching the unified translation lookaside buffer according to the first order code for a hashed page entry, wherein the first order code indicates that the unified translation lookaside buffer should be searched for global pages.

5. The computer implemented method of claim 4, wherein the step of searching a unified translation lookaside buffer according to the first order code for a hashed page entry further comprises:
   responsive to identifying the first order code, performing a first search of the unified translation lookaside buffer, wherein the first search excludes a process identifier from a hash function, and performing a second search of the unified translation lookaside buffer, wherein the second search includes the process identifier in the hash function.

6. The computer implemented method of claim 1 further comprising:
   responsive to locating the hashed page entry, paging the hashed page entry into the unified translation lookaside buffer.

7. A data processing system comprising:
   a processor; and
   a memory management unit comprising a hardware implemented, unified translation lookaside buffer, and a hardware implemented, search priority configuration register, wherein the memory management unit is configured: responsive to a request to access the unified translation lookaside buffer, to identify a first order code within a first entry of the search priority configuration register; responsive to identifying the first order code, to search the unified translation lookaside buffer according to the first order code for a hashed page entry; responsive to not locating the hashed page entry when searching the unified translation lookaside buffer according to the first order code, to identify a second order code within a second entry of the search priority configuration register; and responsive to identifying the second order code, to search the unified translation lookaside buffer according to the second order code for the hashed page entry.

8. The data processing system of claim 7 further comprising:
a memory management module, comprising a hardware implemented, search priority configuration register, wherein the search priority configuration register is a 32-bit search priority configuration register having 8 entries, each entry being 4-bits, wherein the first entry and second entry are ones of the 8 entries.

9. The data processing system of claim 7, wherein the first order code corresponds to a first page size that is stored within the unified translation lookaside buffer, and wherein the second order code corresponds to a second page size that is stored within the unified translation lookaside buffer.

10. The data processing system of claim 9, wherein the first page size and the second page size are selected from a group of page sizes consisting of a 4 kilobyte page size, a 16 kilobyte page size, a 64 kilobyte page size, a 1 megabyte page size, a 16 megabyte page size, a 256 megabyte page size, and a 1 gigabyte page size.

11. The data processing system of claim 7, wherein the request to access the unified translation lookaside buffer is a request in response to one of the group consisting of a cache miss in a shadow translation lookaside buffer, a local or snooped read request from an execution unit, a local or snooped search request from the execution unit, and a local or snooped invalidate request from the execution unit.

12. The data processing system of claim 7, wherein the memory management unit is configured:
responsive to not locating the hashed page entry when searching the unified translation lookaside buffer according to the first order code, to identify a subsequent order code within a subsequent entry of the search priority configuration register; and
responsive to identifying the subsequent order code, to search the unified translation lookaside buffer according to the subsequent order code for the hashed page entry.

13. The data processing system of claim of claim 12, wherein the subsequent order code indicates that no search of the unified translation lookaside buffer should be made.

14. The data processing system of claim of claim 7, wherein the request to access the unified translation lookaside buffer is a request in response to the cache miss in a shadow translation lookaside buffer, wherein the memory management unit is configured:
responsive to identifying the first order code, to search the unified translation lookaside buffer according to the first order code for the hashed page entry, wherein the first order code indicates that the unified translation lookaside buffer should be searched for global pages.

15. The data processing system of claim 14, wherein the searching the unified translation lookaside buffer according to the first order code for the hashed page entry further comprises:
responsive to identifying the first order code, to perform the first search of the unified translation lookaside buffer, wherein the first search excludes a process identifier from the hash function, and to perform the second search of the unified translation lookaside buffer, wherein the second search includes the process identifier in the hash function.

16. The data processing system of claim 7 further comprising:
responsive to locating the hashed page entry, the memory management unit identifies pages the hashed page entry into the unified translation lookaside buffer.

\* \* \* \* \*